United States Patent
Dougherty

[15] 3,647,498
[45] Mar. 7, 1972

[54] PROCESS FOR PRODUCTION OF DENTAL CROWNS
[72] Inventor: Emery W. Dougherty, Milford, Del.
[73] Assignee: Dentsply International Inc., York, Pa.
[22] Filed: Mar. 27, 1970
[21] Appl. No.: 23,483

[52] U.S. Cl. .................................117/8, 32/12, 117/119.6, 117/132 B, 117/161 UC, 117/161 UT, 260/18 EP, 260/881, 260/885
[51] Int. Cl. .......................A61c 5/08, B44c 1/22, B44d 1/36
[58] Field of Search.................117/8, 132 B, 161 UC; 32/12, 32/13, 8

[56] References Cited

UNITED STATES PATENTS

| | | | |
|---|---|---|---|
| 2,930,124 | 3/1960 | Pos | 32/12 |
| 3,052,983 | 9/1962 | Weinstein et al. | 32/12 |
| 3,194,784 | 7/1965 | Bowen | 32/15 X |
| 3,470,615 | 10/1969 | Petner | 117/132 X |
| 3,471,596 | 10/1969 | Petner et al. | 32/12 X |

Primary Examiner—Alfred L. Leavitt
Assistant Examiner—Thomas E. Bokan
Attorney—Sherman and Shalloway

[57] ABSTRACT

A dental composition in the form of a thickened paste comprising:
(A) a solid phase consisting essentially of polymers and copolymers of esters of methacrylic acid with average particle diameters of 10-200 microns and a glass transition temperature of approximately 75°C or less, and
(B) A polymerizable liquid phase consisting essentially of:
(1) from 70 to 90 percent by weight of a polyglycol dimethacrylate or diacrylate, and
(2) 10 to 30 percent by weight of bisphenol A dimethacrylate. Such a thickened dental composition based upon acrylic resins can be used for dental crowns and inlays, particularly as produced by the coating of noble metal crown with subsequent heating to set the coating and shaping to match that of a natural tooth. The presence of a minor amount of bisphenol A dimethacrylate provides the composition with the ability to provide porosity free, strong, hard and stiff moldings with reduced plasticization by water.

7 Claims, No Drawings

PROCESS FOR PRODUCTION OF DENTAL CROWNS

The present invention relates to a novel dental composition based upon acrylic resins, a method of using the same in the production of crowns, inlays, etc., as well as such products per se produced in accordance with present invention; more particularly, the present invention relates to an improved dental composition which allows for the production of porosity free, strong, brittle, hard and stiff moldings, such characteristics being associated with the use of a polymerizable system containing bisphenol A dimethacrylate and methacrylate polymers or copolymers with a glass transition temperature less than approximately 75° C.

A great many materials have been proposed for prosthetic dental applications such as crowns, bridges, inlays, etc. Prominent among them are polymeric compositions based upon acrylic resin systems. Polymers of esters of methacrylic acid possess a combination of properties suiting them to applications within the oral cavity. Polymers of methyl methacrylate in particular form transparent, colorless, water insensitive, stain resistant moldings of good strength with a history of successful applications in the field of restorative dentistry. They may be subtly colored to simulate natural tooth tissue with good retention of their esthetic properties in that environment over a long period of time. Thus, such compositions have had considerable value in the production of crowns and bridges and similar prothestic dental applicances.

In such applications they are not always considered primary structural materials, however, For example, the construction of a dental bridge requires the material to withstand higher stresses in thin sections than can often be sustained by such acrylic polymers. Consequently a usual practice is to engineer the bridge from a metal, for example gold alloys, stainless steels, etc., and to overlay or veneer the metal with acrylic dental polymers to simulate tooth tissue.

The methods by which these materials are applied are various and include, among others, the combination of a powdered, preformed polymer component with a polymerizable liquid component to form a paste or a dough which is packed into a mold. Alternatively, the metal base may be coated by successively applying powder and liquid by means, for example, of a brush to the metal base. Such combinations of powdery polymer and liquid, containing a polymerization catalyst, may be caused to polymerize by the application of heat, or electromagnetic radiation, or by their simple combination when the components contain the essential ingredients of a redox polymerization system.

An essential characteristic of such polymerized products is that they are essentially free of porosity. Gross porosity has the ability to alter the color of the molding by light interference, causing it to appear more opaque than intended, and to harbor bacteria and oral debris which may lead to subsequent discoloration and lack of cleanliness.

Methyl methacrylate may serve as the polymerizable liquid component in such compositions. In some applications however, methyl methacrylate is excessively volatile. If the temperature of the polymerizing body rises too greatly, the vapor pressure of the liquid may cause gas bubbles to form which appear as porosity in the finished article. To reduce the possibility of porosity from this cause, especially where heat is applied, higher methacrylate esters may be employed.

Such a system, is shown, for example, in U.S. Pat. No. 3,012,287 to Tucker, which composition is based upon the presence of a finely divided methyl methacrylate polymer and bifunctional methacrylate monomer, e.g., polyethylene glycol dimethacrylate, for the production of composite polymerized articles useful for dental purposes.

It is seen, nonetheless, that polymerized articles formed from, for example, a powdery component consisting of polymethylmethacrylate and a liquid consisting of triethylene glycol dimethacrylate is excessively porous when used in ordinary dental technic, i.e., alternate applications of powder and liquid polymerized by the application of heat. The present invention relates to a composition consisting of a suitable powdery, preformed polymer with a combination of dimethacrylate esters, as hereinafter described, which composition produces strong, hard and stiff moldings free of porosity, thus obviating one of the major deficiencies of the previously described materials.

It has been found that the porosity development in such solid-liquid systems is related to the glass transition temperature (Tg) of the polymer employed.

In this regard, given bubble free preparations of suspension polymers, e.g., methyl methacrylate and its copolymers with other acrylates, higher methacrylates, styrene, acrylonitrile, etc., the Tg of the polymer is the overriding parameter in determining porosity characteristics of the system. Thus, note the following data in Table 1.

TABLE 1

| Polymer Composition | | | Porosity | Tg°C. |
|---|---|---|---|---|
| 100% Methyl Methacrylate | | | Heavy | 105 |
| 70 MMA* 30 ACCN** | | | Moderate | 103 |
| 98 MMA 2 EHA*** | | | Moderate | 100 |
| 60 MMA 40 ACCN | | | Heavy | 100 |
| 94 MMA 6 EHA | | | Moderate-Light | 93 |
| 40 MMA 40 EMA 20 STY**** | | | Light | 80 |
| 40 MMA 40 MA 20 STY | | | Light-None | 78–80 |
| 86 MMA 12 EHA | | | None | 76 |
| 50 MMA 40 ACCN 10 EHA | | | None | 75 |
| 82 MMA 18 EHA | | | None | 60 |
| 75 MMA 25 EHA | | | None | 45 |

\* MMA=Methyl Methacrylate

\*\* ACCN=Acrylonitrile

\*\*\* EHA=Ethyl Hexyl Acrylate

\*\*\*\* STY=Styrene

In Table 1, preparations of suspension polymers with particle sizes between 10–200 microns were dusted into a hemispherical cavity 5 mm. in diameter and 2–3 mm. deep made in an aluminum milk dish which contained triethylene glycol dimethacrylate. The powder was dusted until the liquid would no longer wet it and the excess was dumped off. The mass was heated in an airstream up to a maximum of 275° F. to induce polymerization. Porosity was evaluated by visual inspection and classified as either heavy, moderate, light or none. Glass transition temperatures were calculated from the composition. To provide a porosity free molding an acrylic polymer or copolymer may or may not contain plasticizer. The addition of a plasticizer, for example, dibutyl phthalate, is an effective way to reduce the Tg of the polymer or copolymer. The essential characteristic is that the preformed polymeric, powder component, consisting of spherical particles 10–200 microns in average diameter, have a Tg of less than approximately 75° C.

Many acrylic polymers and copolymers with a satisfactorily low Tg are so flexible that they confer lower stiffness and strength to compositions of which they are a part. Thus, while such a system prepared from a finely divided polymer of suitable Tg, e.g., a plasticized polymer of methyl methacrylate, and a bifunctional methacrylate monomer, e.g., polyethylene glycol dimethacrylate, is effective for the production of porosity free moldings, such a composition suffers from the fact that the stiffness and strength of moldings are less than if unplasticized polymethyl methacrylate had been used. Similarly, the use of polyethylene glycol dimethacrylates as the liquid polymerizable phase results in less stiffness and strength, and increased water sorption in compositions of which they are a part, as the molecular weight of the polyethylene glycol from which the diester is prepared increases. Thus, compositions prepared with tetraethylene glycol dimethacrylate are more flexible, have greater water sorption, and are more plasticized by water than those prepared from triethylene glycol dimethacrylate. Compositions which absorb excessive concentrations of water can be changed in appearance by blanching or by a change in refractive index. These changes, of course, cannot be easily tolerated when the above compositions are employed as dental prosthetic materials wherein esthetic characteristics are of principle importance.

It has been discovered in accordance with the present invention that the above disadvantages of previously utilized dental compositions can be significantly reduced or eliminated through the employment of a resin composition which comprises a solid phase consisting essentially of polymers or copolymers of esters of methacrylic acid with glass transition temperatures of 75° C. or less and a polymerizable liquid phase consisting essentially of 70 to 90 percent by weight of a polyglycol dimethacrylate and 10 to 30 percent by weight of bisphenol A dimethacrylate (bis(4-hydroxyphenol)-2-propane dimethacrylate). Such a composition has a significantly increased stiffness, hardness, and strength while possessing a reduced water sorption.

Accordingly, it is principal object of the present invention to provide a novel dental resin composition, method of using the same, and products produced therefrom, wherein such composition, method, and products have eliminated the inherent deficiencies and disadvantages of previously employed dental compositions.

It is a further object of the present invention to provide such a novel dental resin composition, process and product wherein such composition allows for the production of porosity free, strong, brittle, hard and stiff moldings with reduced plasticization upon immersion in water.

It is yet a further object of the present invention to provide such a novel dental resin composition, process and product wherein said composition comprises a solid phase consisting essentially of polymers or copolymers of esters of methacrylic acid with glass transition temperature of 75° C. or less, alone or in combination, and a polymerizable liquid phase consisting essentially of a mixture of a polyglycol dimethacrylate and bisphenol A dimethacrylate.

Still further objects of the novel composition, process and product of the present invention will become more apparent from the following more detailed description thereof.

As indicated above, the present invention is primarily predicated upon a novel dental resin composition in the form of a thickened composition comprising (A) a solid phase consisting essentially of polymers or copolymers of esters of methacrylic acid with glass transition temperatures of 75° C. or less, alone or in combination and (B) a polymerizable liquid phase consisting essentially of (1) from 70 to 90 percent by weight of a polyglycol dimethacrylate and (2) from 10 to 30 percent by weight of bisphenol A dimethacrylate. In this regard, as indicated previously, it has been discovered in accordance with the present invention that the inclusion of bisphenol A dimethacrylate in the liquid or monomeric phase of the dental resin composition eliminates the disadvantages of previously proposed compositions by allowing the preparations of porosity free, strong, brittle, hard and stiff moldings which, due to the presence of bisphenol A dimethacrylate, have a substantially lessened water sorption and a substantially lessened degree of plasticization by water.

The novel dental resin composition of the present invention is particularly adapted for the production of acrylic crowns, bridges, inlays, composite artificial teeth and other dental products in which an acrylic resin is generally employed. In this regard, the employment of the composition of the present invention has as its advantage the preparation of porosity free moldings and other characteristics. In this regard, the composition of the present invention is particularly adapted for the production of acrylic crowns herein the acrylic resin composition is coated upon a noble metal support with subsequent heating to set the coating and shaping to match that of a natural tooth, such composition allowing the production of the crown without the use of expensive and complicated equipment and procedures.

The polymers and copolymers which are utilized as the solid phase in accordance with the novel dental resin composition of the present invention can comprise any of those materials which have been previously conventionally utilized in the production of dental compositions. Thus, for example, prior to the recent developments in the dental art which have lead to improvement in dental compositions it was customary to produce a polymer-monomer dough mix for the production of artificial teeth, etc., wherein the solid portion constituted polymerized methyl methacrylate plasticized in an amount of from 5 to 15 percent by weight with a suitable plasticizer such as dibutyl phthalate, dioctyl phthalate, etc., the monomer portion being methyl methacrylate monomer. Such a composition is shown, for example, in U.S. Pat. No. 2,234,993 to Vernon et al., such patent illustrating a methyl methacrylate polymer-methyl methacrylate monomer mix which is tinted, pigmented and shaded and, thereafter, molded at elevated temperatures and pressures to simulate the desired portions of the teeth, gums, etc.

In accordance with the present invention, the methyl methacrylate polymer or copolymer is generally employed in a finely divided form, preferably in the form of transparent beads having average diameters within the range of 10-200 microns. Such methyl methacrylate polymers which can be advantageously utilized in accordance with the present invention are those which generally have a molecular weight within the range of 400,000-2,000,000, preferably in the range of 600,000-900,000, the same being optionally pigmented so as to simulate the desired part of the teeth, gums, etc. Thus, for example, the suitable pigments which can be advantageously utilized are those which are suitable for any and all dental compositions, including for example, such materials as zinc oxide, titanium dioxide, cadmium sulfide, iron oxide, cadmium selenide, carbon black, burnt siena, etc.

Again, it is pointed out that the polymers and copolymers utilized in accordance with the novel composition of the present invention can generally comprise any of those conventional materials generally utilized in the production of dental compositions of the prior art providing they meet the requirements with respect to Tg. Thus, such polymers and copolymers are generally prepared by the suspension polymerization of the methyl methacrylate monomer, comonomer and/or plasticizer utilizing a free radical initiating catalyst, generally a peroxide catalyst. Accordingly, the polymers and copolymers employed as a fine powder in accordance with the novel dental resin composition of the present invention may contain a minor amount, e.g., up to about 2 percent by weight of residual peroxide catalyst. The presence of such residual peroxide tends to assist in the final curing of setting of the dental composition while not otherwise interfering with the composition in any manner.

Similarly, as indicated previously, use may be made of a plasticized polymethyl methacrylate since the use of suitably plasticized polymer allows for the preparation of porosity free moldings. In this respect, also, any conventional plasticizer generally utilized for the plasticization of polymethyl methacrylate can be employed in accordance with the present invention. Accordingly, in addition to the phthalate plasticizers enumerated above such suitable plasticizers can include any of:

butyl phthalyl butyl glycolate
ethyl phthalyl ethyl glycolate
sucrose acetate butyrate
epoxidized soy bean oils
chlorinated paraffins
acetyl triethyl citrate, etc.

The degree of plasticization of the polymethyl methacrylate is again that which is conventional and generally utilized in the art. Thus, for example, the polymethyl methacrylate resin constituting the solid phase portion of the novel dental resin composition of the present invention can be plasticized with from about 5 to 20 percent by weight of a suitable plasticizer as set forth above. Within the above limits and by utilizing the liquid phase monomeric system in accordance with the present invention it is possible to produce porosity free moldings which are strong, brittle, hard and stiff and have reduced plasticization tendencies when contacted with water.

The above-described polymeric material constituting the solid phase of the novel dental resin composition of the present invention generally comprises from about 40 to 80 percent by weight of the dental resin composition, the remainder of the thickened composition, i.e., 20 to 60 percent by weight, constituting the liquid polymerizable phase as to be hereinafter discussed. Generally, the solid polymerized methyl methacrylate phase of the novel dental resin composition comprises from bout 50 percent to about 75 percent by weight of the composition with from about 25 percent to about 50 percent by weight constituting the polymerizable liquid phase. Of course, where desired for particular purposes or wherein specific manipulative steps are involved slightly lesser or greater amounts of the solid phase can be utilized thereby producing a slightly thinner or slightly thicker dental resin composition. However, within the limits set forth above, a thixotropic, jellylike, consistency is provided which can be easily formed, molded, and shaped into a variety of dental products. Accordingly, it is preferred in accordance with the present invention to operate with such a puttylike consistency utilizing a solid phase-liquid polymerizable phase ratio within the ranges set forth above.

Portions of the polymer or copolymer resin constituting the solid phase of the novel dental composition may be replaced by conventional dental fillers, such as finely divided fused quartz, natural quartz, aluminosilicate glasses, etc., with suitable refractive indices, to further stiffen the composition, produce greater apparent hardness, and significantly reduce loss by abrasion. The glasses may be used in concentrations from 0 to 80 percent by weight. They may not replace the polymer entirely because the polymer offers viscosity control at elevated temperatures and accelerates polymerization. Preferred concentrations are from 5 to 15 percent.

The novel dental resin composition of the present invention differs from anything heretofore developed in the field of dentistry in the composition of the liquid polymerizable phase. In this regard, as indicated previously, the liquid polymerizable phase of the dental resin composition is one which consists essentially of from 70 to 90 percent weight of a polyglycol dimethacrylate and from 10 to 30 percent by weight of bisphenol A dimethacrylate, i.e., bis(4-hydroxyphenol)-2,2-propane dimethacrylate.

The glycol dimethacrylates which can be employed in accordance with the present invention are generally those which are shown in U.S. Pat. No. 3,012,287 to Tucker, the same comprising bifunctional methacrylate monomers useful as cross-linking agents. Such glycol dimethacrylates include such as diethylene glycol dimethacrylate, triethylene glycol dimethacrylate, tetraethylene glycol dimethacrylate and higher polyglycol dimethacrylate monomers. While it has been proposed to employ only the above glycol dimethacrylate cross-linking monomers as the liquid phase in a dental resin dough, the use of such monomers alone does not result in a particularly satisfactory dental composition or product in that the final product has a high water sorption and somewhat insufficient characteristics with regard to strength, stiffness, etc. Accordingly, to overcome these deficiencies it has been discovered in accordance with the present invention that the use of a liquid polymerizable phase consisting essentially of the polyglycol dimethacrylate monomer and a further dimethacrylate, i.e., bisphenol A dimethacrylate, eliminates all of the above disadvantages by providing a porosity free, strong, brittle, hard and stiff molding having a reduced tendency toward plasticization upon contact with water. Accordingly, the improvement associated with the novel composition, process, and product of the present invention comprises the use of a dental resin composition in the form of a paste or thixotropic, jellylike putty wherein the same consists essentially of a solid phase comprising plasticized polymethyl methacrylate and a liquid polymerizable phase consisting essentially of from 70 to 90 percent by weight of a polyglycol dimethacrylate and from 10 to 30 percent by weight of bisphenol A dimethacrylate. Similarly, the corresponding polyglycol diacrylate can also be used.

In accordance with the present invention, it is preferred that the bisphenol A dimethacrylate monomer be employed at or near the upper limit, i.e., 20 to 30 percent by weight based upon the weight of the liquid system. Such upper limit constitutes the solubility of such monomer in the liquid phase of the system. It is advantageous to provide as much of the bisphenol A dimethacrylate as possible since the inclusion of this monomer in the liquid phase of the novel dental resin composition effects the advantageous characteristics or properties as set forth above. Accordingly, while such monomer can comprise from 10 to 30 percent by weight of the liquid polymerizable phase it is preferred that the same be present in a concentration which provides for mutual solubility at ordinary room temperatures, e.g., an amount of about 20 percent by weight with regard to triethylene glycol dimethacrylate.

While the use of bisphenol A dimethacrylate creates all of the advantages described above, one possible disadvantage with regard to the use of such monomeric material resides in the fact that the shelf life of the composition may be reduced somewhat, particularly under cold temperature conditions since bisphenol A dimethacrylate tends to crystallize from the solution of monomers under cold conditions. To eliminate this minor problem, a portion of the bisphenol A dimethacrylate monomer in the liquid polymerizable phase of the novel dental resin composition of the present invention can be replaced with an adduct of bisphenol A and glycidyl methacrylate. The use of such adduct of bisphenol A and glycidyl methacrylate as a replacement for up to about 50 percent by weight of the bisphenol A dimethacrylate monomer eliminates the crystallization problem and an extremely long shelf life is created even under cold temperature conditions. Accordingly, it is often preferred in accordance with the present invention to include in the liquid phase of the novel composition of the present invention a minor amount of the adduct of bisphenol A and glycidyl methacrylate replacing up to 50 percent by weight of the bisphenol A dimethacrylate monomer.

In addition to the employment of the polyglycol dimethacrylate, bisphenol A dimethacrylate, and optional employment of the adduct of bisphenol A and glycidyl methacrylate it is also possible in accordance with a further embodiment of the present invention to replace a further portion of the polyglycol dimethacrylate with a further polymerizable monomeric material, e.g., an aromatic monomethacrylate. Thus, for example, in accordance with this embodiment of the present invention up to about 50 percent by weight of the polyglycol dimethacrylate, e.g., triethylene glycol dimethacrylate can be replaced with a suitable aromatic monomethacrylate, e.g., benzylmethacrylate, or a similar aromatic monomethacrylate such as substituted benzylmethacrylates, e.g.;

isobornyl methacrylate
phenyl methacrylate
o-cresyl methacrylate
2-phenyl-2-propyl methacrylate
α,β dimethyl benzyl methacrylate, etc.

Accordingly, while in its broadest context the polymerizable liquid phase of the novel dental composition of the present invention consists essentially of 70 to 90 percent by weight of a polyglycol dimethacrylate and 10 to 30 percent by weight of bisphenol A dimethacrylate up to 50 percent of the polyglycol dimethacrylate can be replaced with a suitable aromatic monomethacrylate e.g., benzylmethacrylate, and up to 50 percent by weight of the bisphenol A dimethacrylate can be replaced with the adduct of bisphenol A and glycidyl methacrylate. Accordingly, the polymerizable liquid phase of the novel dental composition of the present invention can range from the two component composition, as previously set forth, to a four component composition when the optional aromatic monomethacrylate and adduct are utilized. In addition, it should be quite clear that while the above discussion has been presented primarily with respect to the use of a single polyglycol dimethacrylate etc., combinations of two or more liquid polymerizable monomers can be suitable utilized in accordance with the present invention as long as the amount of such polymerizable monomer falls within the ranges set forth above. In this regard, it is within such ranges that it has been discovered in accordance with the present invention that it is possible to produce porosity free, strong, brittle, hard and stiff moldings having a lessened degree of plasticization upon contact or immersion in water.

As indicated previously, the novel dental resin composition of the present invention is particularly adapted for the production of acrylic crown and bridge products, among others. In this regard, the novel composition of the present invention can be utilized in the same manner as previous prior art materials except that the composition when utilized provides for the improvement set forth above with regard to allowing the production of porosity free, strong, brittle, stiff and hard moldings having reduced tendancy toward plasticization by water.

In the production of acrylic crowns utilizing the novel composition of the present invention, the thickened composition in the form of a paste or putty is generally applied by the well known brush-on technique wherein the desired thickness of the acrylic material is built up in layers upon a noble metal or similar support. Following application of the dental resin composition to the metal support, e.g., noble metal support, the composition is subsequently heated to set the coating with shaping to match that of the natural tooth. Heat setting can be easily accomplished in accordance with the present invention by heating the support and coating to a temperature of from about 250°–500° F. for 1 to 30 minutes in order to polymerize and set the coating, the polymerization of the liquid monomers taking place during such heating. In this way, it is possible to provide a cross-linked resin composition having the shape of the natural tooth and having characteristics similar to porcelain. In this regard, it is again pointed out that in accordance with the present invention it is possible to provide porosity free moldings which have brittle, hard and stiff chracteristics. In addition, by employing the bisphenol A dimethacrylate monomer in the liquid phase in accordance with the present invention, it is possible to provide moldings which have a reduced degree of plasticization upon immersion or contact with water.

As indicated above, the preferred method of use of the novel compositions of the present invention involves the preparation of dental crowns and inlays by the well-known brush-on technique. By such a procedure, after application of a conventional opaquing layer containing suitable pigments, the novel composition of the present invention is applied by brushing the same onto the support. The novel composition of the present invention is preferably applied as thin applications or layers of about 1 mm. or less so as to prevent excessive shrinkage and possible checking of the resin. When producing the thin applications or layers of the novel composition of the present invention a brush is moistened with the liquid polymerizable phase and then allowed to pick up small amounts of the polymer powder, so as to produce wet beads which are applied to the opaque casting. Again, it is somewhat important that the composition of the present invention be applied in thin layers so as to prevent mechanical air entrapment and excessive shrinkage during curing. Generally, the application of the novel composition of the present invention to the opaque casting is made by moving from the gingival to the incisal areas when applying the wet beads.

After each application of the novel composition of the present invention the casting containing the opaqued layer and thin application of wet beads is warmed as by passing the same beneath a heat blower, the warming being continued until the resin surface has partially cured and has a semigloss appearance. Generally, the warming in an air stream issuing at a temperature of about 300°–500° F. has to be conducted for only a few seconds. When warming the product in accordance with the present invention the resin surface should be continuously moved at all times so as to prevent overheating which would result in burning. Thus, if vapor begins to rise from the surface of the resin, it is obvious that the heat has become too intense and the resin has begun to volatilize. Burning of the resin if continued would generally result in the formation of bubbles appearing as light spots on the surface of the casting.

The application of thin layers of the novel composition of the present invention with intermittent warming is conducted until the proper contour of the tooth has been achieved with a slight overbuilding. Of course, after the contour of the desired dental product has been overbuilt with applications of the novel compositions of the present invention the product is cured as set forth previously. The overbuilding is achieved so as to allow for any shrinkage which takes place during curing and to allow the product to be thereafter ground and polished by conventional standard techniques to provide a product simulating that of the natural tooth.

In addition to such production of dental crowns and inlays by conventional techniques, it is, of course, obvious that the novel dental composition of the present invention can be utilized in any of the previous areas in which those compositions of the prior art have been previously utilized. In U.S. Pat. No. 2,420,570 to Shapiro a composite artificial tooth and dentures produced therefrom is disclosed. This patent discloses that a suitable artificial tooth can be provided wherein the central or core portion comprises polymethylmethacrylate which simulates natural dentine while the outer exposed portion is prepared by the polymerization of a glycol dimethacrylate monomer in the presence of a polymerized methyl methacrylate polymer so as to provide a composition which simulates enamel. Accordingly, such a composite artificial tooth can be vastly improved in accordance with the present invention by allowing the exterior portion to be prepared from the novel dental composition of the present invention wherein the liquid phase comprises a polyglycol dimethacrylate and bisphenol A dimethacrylate. Accordingly, by providing such a composition for the exterior or outer surface of a composite artificial tooth it is possible to provide such a product having excellent characteristics of hardness, brittleness and freedom from porosity.

Again, it is pointed out that above uses are only exemplary of those to which the novel composition of the present invention can be put. In this regard, it is again pointed out that the novel composition of the present invention can be employed in any of those environments in which the conventional materials of the prior art have been previously utilized.

The novel composition and process of the present invention will now be illustrated by reference to the following specific examples. It is to be understood, however, that such examples are presented for purposes of illustration only and the present invention is in no way to be deemed as limited thereto.

EXAMPLE 1

A composition was prepared in accordance with the present invention wherein the solid phase was composed of 100 parts by weight of SR type 1, superfine polymethyl methacrylate, a plasticized polymethyl methacrylate of suitable particle size. To the polymethyl methacrylate produced by the suspension polymerization technique utilizing a peroxide free radical initiating catalyst was added 1.0 parts by weight of benzoyl peroxide.

The liquid portion of the composition was prepared by mixing 80 parts by weight of triethylene glycol dimethacrylate and 20 parts by weight of bisphenol A dimethacrylate. In the preparation of a pastelike composition the powder phase, i.e., plasticized polymethyl methacrylate, and liquid phase, i.e., triethylene glycol dimethacrylate and bisphenol A dimethacrylate were blended in a ratio of 2.0 g. powder to 1.2 g. liquid.

Utilizing the two compositions, castings were prepared in order to determine certain physical properties. Thus, the transverse properties were measured according to American Dental Association specification 12 as were the water sorption, water solubility and color change. In addition, further tests were conducted for impact strength, tensile strength, compressive strength and Knoop hardness.

The results of such tests and measurements are shown in the following Table 2.

The results set forth in the above table are particularly noteworthy with regard to water sorption, water solubility, and color change. In this regard, it will be noted that the composition of the present invention shows a substantially lesser amount of water sorption and water solubility and the color change which occurs is hardly perceptible. On the other hand, a composition not containing bisphenol A dimethacrylate has a higher water solubility and a higher water sorption, therefore, leading to a greater color change after 7 days in water at 70° C. This is apparently due to the fact that the composition absorbs water which causes blanching thereby changing the refractive index of the composition. This, therefore, attributes to the other change associated with the product not containing bisphenol A dimethacrylate.

Accordingly, it can be seen from the tabulated data above that the composition of the present invention allows for the production of porosity free, brittle, hard and stiff moldings yet those which have a reduced degree of plasticization upon contact with water. This, therefore, provides a distinct advantage of the compositions of the present invention which comprise plasticized polymethyl methacrylate or other polymers or copolymers of esters of methacrylic acid with glass transition temperatures as the solid phase and a liquid phase comprising a polyglycol dimethacrylate and bisphenol A dimethacrylate.

EXAMPLE 2

The same composition as set forth in Example 1 was employed in further comparative tests, the composition comprising a solid phase of 100 parts by weight of plasticized polymethyl methacrylate (SR type 1, superfine) and a liquid phase comprising 20 parts by weight of bisphenol A dimethacrylate and 80 parts by weight of triethylene glycol dimethacrylate. Two control compositions were prepared, the first being one in which the liquid polymerizable phase consisted solely of triethylene glycol dimethacrylate with the second being one in which the liquid polymerizable phase consisted solely of tetraethylene glycol dimethacrylate. Here again, tests were conducted for transverse properties according to ADA Spec. 12 as well as Knoop hardness, color change, impact strength, etc. The results are tabulated in Table 3.

The results set forth in the above table are similar to those of Example 1 indicating again the lesser color change associated with the composition of the present invention. In this regard, while the wet color change was barely perceptible when the liquid polymeric phase contained bisphenol A dimethacrylate whitening occurred in both of the compositions not containing such monomeric component. In addition, there was substantial whitening when tetraethylene glycol dimethacrylate constituted the sole portion of the liquid phase as compared to that composition utilizing triethylene glycol dimethacrylate. This, therefore, indicates that as the molecular weight of the poly glycol dimethacrylate increases the composition has a greater degree of water solubility and water sorption and, is therefore more susceptible to a color change through the phenomenon of blanching.

In addition, the above data set forth in Table 3 as well as the data in Table 2 indicates that the composition of the present invention has better flexural strength, higher compressive

TABLE 3

| | | | |
|---|---|---|---|
| Powder composition, percent of Type 1 polymer | 100 | 100 | 100 |
| Liquid composition, percent of: | | | |
| Bisphenol dimethacrylate | 20 | | |
| Triethylene glycol demethacrylate | 80 | 100 | |
| Tetraethylene glycol demethacrylate | | | 100 |
| *Transverse properties according to ADA Spec. 12: | | | |
| 3.5 kg. load, mm. deflection at | 2.20 | 2.60 | 4.18 |
| 5.0 kg. load | 4.90 | 6.80 | 12.25 |
| Time of break, minutes | 9.3 | 9.0 | 7.3 |
| Apparent flexural modulus from above, p.s.i | 258,000 | 215,000 | 140,000 |
| Flexural strength, from above, p.s.i | 10,900 | 9,800 | 8,300 |
| Impact, unnotched Izod, wet 3 days at 37° C. average ft. lbs./inch. | 0.55 | 0.75 | 0.90 |
| Color change, wet 7 days at 70°C | Barely perceptible. | Very slight whitening. | (**) Whitened |
| Knoop hardness number, wet 7 days at 37°C | 15.4 | 13–14 | 10.2 |
| Knoop hardness number, dry | 19.5 | 16–18 | 16.6 |

*Transverse bend tests are performed after 3 days in water at 37° C.
**7 days wet at 37° C.

TABLE 2

| | Without | With |
|---|---|---|
| Powder composition, percent of Type 1 polymer. | 100 | 100 |
| Liquid composition, percent of: | | |
| Triethylene glycol dimethacrylate (SR 205) | 100 | 80 |
| Bisphenol dimethacrylate | | 20 |
| *Transverse properties according to ADA Spec. 12: | | |
| 3.5 KG load, mm. deflection at | 2.60 min. | 2.20 |
| 5.0 KG load | 6.80 | 4.90 |
| Time of break | 9.0 min. | 9.3 |
| Apparent flexural modulus, from above, p.s.i. | 215,000 | 258,000 |
| Flexural strength, from above, p.s.i | 9,800 | 10,900 |
| *Impact, unnotched Izod, wet 3 days at 37°C., average ft. lbs./inch. | 0.75 | 0.55 |
| Tensile strength, diametral, wet 7 days at 37°C., 2 in./min. | 4550 p.s.i. | 4770 |
| Compressive strength, wet 7 days at 37° C., 2 in./min. | 17,000 p.s.i. | 19820 |
| Color change, UV, ADA Spec. 12 | Very slight. | Hardly perceptible. |
| Color change, wet 7 days at 70° C | Very slight whitening. | None |
| Water sorption, ADA Spec. 12, mg./cm.² | 0.8 | 0.6 |
| Water solubility, ADA Spec. 12, mg./cm.² | 0.04 | 0.01 |
| Knoop hardness number, wet 7 days at 37° C | 13–14 | 15.4 |
| Knoop hardness number, dry | 16–18 | 19.5 |

*Transverse bend tests are performed after 3 days in water at 37° C.

strength and greater hardness than similar compositions not containing the bisphenol A dimethacrylate monomer in the liquid polymerizable phase.

EXAMPLE 3

Further compositions were prepared as in Example 1 in accordance with the present invention except that the bisphenol A dimethacrylate was partially replaced by 2.5 parts and 5 parts of an adduct of bisphenol A and glycidyl methacrylate. When similar tests are made utilizing such composition comprising polymethyl methacrylate as the solid phase and a liquid phase comprising triethylene glycol dimethacrylate, bisphenol A dimethacrylate, and the adduct of bisphenol A and glycidyl methacrylate similar results occur. That is, the composition allows for the production of porosity free, hard, strong, brittle stiff castings having a reduced tendency towards plasticization with water. In addition, when such compositions containing bisphenol A dimethacrylate and an adduct of bisphenol A and glycidyl methacrylate as a partial replacement therefore are subjected to a refrigeration test in order to determine their shelf life, no problem with respect to crystallization of the monomers occurs.

EXAMPLE 4

A composition similar to that of the present invention utilized in Example 1 was prepared except that the liquid phase was made up of 50 parts by weight of triethylene glycol dimethacrylate, 30 parts by weight of benzyl methacrylate and 20 parts by weight of bisphenol A dimethacrylate. When such a composition is tested as in Example 1, it is again noted that porosity free, hard, brittle, stiff moldings and castings can be prepared.

In addition such materials have a lower water sorption and lower water solubility than similar compositions not containing bisphenol A dimethacrylate or benzyl methacrylate.

EXAMPLE 5

Example 1 was repeated except that the composition in accordance with the present invention was composed of a solid phase comprising 100 parts by weight of plasticized polymethyl methacrylate as in Example 1 and the liquid phase was composed of 90 parts by weight of triethylene glycol dimethacrylate and 10 parts by weight of bisphenol A dimethacrylate. When similar test were made, the above composition was also found to possess advantageous properties. Here again, porosity free, hard, brittle, stiff moldings and castings could be prepared, the same having a lessened degree of plasticization with water.

EXAMPLE 6

A further composition was prepared in accordance with the present invention utilizing a solid phase of polymethyl methacrylate and fused quartz and a liquid phase consisting of 20 percent bisphenol A dimethacrylate and 80 percent triethylene glycol dimethacrylate. The solid powder phase and liquid phase were mixed in a ratio of 2.0/1.2, the fused quartz replacing 5 percent by weight of the polymeric component of the solid phase.

A test was made to determine the volume loss by abrasion utilizing such a filled composition after forming the same into a suitable dental product. The loss was found to be 12.9 microliters as compared to a loss of 34.5 microliters under the same test conditions utilizing an unfilled polymer, i.e., the same composition absent fused quartz.

The above examples clearly illustrate the advantages associated with the novel composition and process of the present invention. Again, such composition is based upon a solid phase consisting of polymers and copolymers of esters of methacrylic acid with average particle diameters of 10–200 microns and a glass transition temperature of 75° C. or less, optionally containing residual peroxide catalyst, and a liquid phase consisting of the polyglycol dimethacrylate and bisphenol A dimethacrylate. Similarly, the other various modifications set forth above constitute further embodiments of the present invention.

While the present invention has been described primarily with regard to the foregoing specific exemplification, it must be understood that the present invention is in no way to be deemed as limited thereto but must be construed as broadly as any or all equivalents thereof.

What is claimed is:

1. In a process for the production of a noble metal crown comprising coating a resin composition on a metal support with subsequent heating to set the coating and shaping to match that of a natural tooth, the improvement which comprises using as said resin composition a thickened composition comprising:
   A. a solid phase consisting essentially of polymers or copolymers of esters of methacrylic acid with glass transition temperatures of 75° C. or less and
   B. a polymerizable liquid phase consisting essentially of
      1. from 70 to 90 percent by weight of a polyglycol dimethacrylate and
      2. 10 to 20 percent by weight of bisphenol A dimethacrylate, said solid phase and polymerizable liquid phase being present in a range of 40 to 80 percent and 20 to 60 percent by weight respectively.

2. The process of claim 1 wherein said resin composition coating is built up in stages by the application of thin layers thereof with warming between applications to partially cure the preceding application.

3. The process of claim 1 wherein said polymerizable liquid phase consists essentially of 80 percent by weight of a polyglycol dimethacrylate and 20 percent by weight of bisphenol A dimethacrylate.

4. The process of claim 3 wherein said polyglycol dimethacrylate is triethylene glycol dimethacrylate.

5. The process of claim 1 wherein up to 50 percent by weight of said bisphenol A dimethacrylate is replaced with an adduct of bisphenol A and glycidyl methacrylate.

6. The process of claim 1 wherein up to 50 percent by weight of said polyglycol dimethacrylate is replaced with an aromatic monomethacrylate.

7. The process of claim 6 wherein said aromatic monomethacrylate is benzyl methacrylate.

* * * * *